(12) United States Patent
Fisher et al.

(10) Patent No.: US 10,578,150 B2
(45) Date of Patent: Mar. 3, 2020

(54) COMBUSTION ENGINE CONNECTING ROD

(71) Applicant: GM GLOBAL TECHNOLOGY OPERATIONS LLC, Detroit, MI (US)

(72) Inventors: John B. Fisher, Flint, MI (US); Ronald J. Helmstadt, Bridgeport, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/043,743

(22) Filed: Jul. 24, 2018

(65) Prior Publication Data
US 2020/0032837 A1 Jan. 30, 2020

(51) Int. Cl.
*F16C 7/02* (2006.01)
*F02B 75/32* (2006.01)

(52) U.S. Cl.
CPC .............. *F16C 7/023* (2013.01); *F02B 75/32* (2013.01); *F16C 2360/22* (2013.01)

(58) Field of Classification Search
CPC ........ F16C 2360/22; F16C 9/04; F16C 7/023; F16C 7/06; F16C 7/00; F16C 7/02
See application file for complete search history.

(56) References Cited

U.S. PATENT DOCUMENTS

| | | | | |
|---|---|---|---|---|
| 3,482,468 A | * | 12/1969 | De Biasse | F16C 7/023 74/579 R |
| 4,593,660 A | * | 6/1986 | Elsbett | F02F 3/0069 123/193.6 |
| 4,827,795 A | * | 5/1989 | Machida | F16C 7/023 123/197.3 |
| 7,802,493 B2 | * | 9/2010 | Kubota | F16C 7/023 74/579 R |
| 2004/0159180 A1 | * | 8/2004 | Ogawa | B21D 37/16 74/593 |
| 2013/0276741 A1 | * | 10/2013 | Pauls | F16C 7/023 123/193.6 |
| 2018/0087562 A1 | * | 3/2018 | Matsuda | B21D 37/16 |

\* cited by examiner

*Primary Examiner* — Long T Tran
(74) *Attorney, Agent, or Firm* — Cantor Colburn LLP

(57) ABSTRACT

A connecting rod is adapted to extend between, and connect to, a crankshaft and a piston pin. The connecting rod includes first and second end portions, and an elongated rail. The first end portion is adapted to connect to the crankshaft. The second end portion is adapted to connect to the piston pin. The elongated rail longitudinally extends between the first and second end portions, and includes a first and second flanges, and a web. The first flange has opposite outer and inner first faces. The second flange has opposite outer and inner second faces. The web has opposite first and second surfaces, and laterally spans between, and is attached to, the inner first face and the inner second face. The inner first face and the inner second face, at least in-part, converge toward one-another as the rail extends from the first end portion to the second end portion.

17 Claims, 2 Drawing Sheets

COMBUSTION ENGINE CONNECTING ROD

INTRODUCTION

The subject disclosure relates to a connecting rod, and more particularly, to a tapered rail of the connecting rod.

Combustion engine connecting rods typically connect a crankshaft of a combustion engine to a part of a piston, such as a piston pin. Under various combustion engine events, the connecting rod may be exposed to isolated stresses. As a result, the entire rod may be over designed undesirably adding to weight and bulk.

Accordingly, it is desirable to provide a connecting rod designed to evenly distribute stress produced by various combustion engine events to reduce rod weight and optimize robustness.

SUMMARY

In one exemplary embodiment a connecting rod is adapted to extend between, and connect to, a crankshaft and a piston pin. The connecting rod includes a first end portion, a second end portion, and an elongated rail. The first end portion is adapted to connect to the crankshaft, and the second end portion is adapted to connect to the piston pin. The elongated rail longitudinally extends between the first and second end portions, and includes first and second flanges and a web. The first flange has opposite outer and inner first faces. The second flange has opposite outer and inner second faces, and the web has opposite first and second surfaces. The web laterally spans between, and is attached to, the inner first face and the inner second face. The inner first face and the inner second face at least in-part converge toward one-another as the rail extends from the first end portion to the second end portion.

In addition to one or more of the features described herein, the elongated rail includes a longitudinal length measured from the first end portion to the second end portion, and the convergence of the inner first face and the inner second face initiates proximate to the second end portion and spans within a range of twenty to fifty percent of the longitudinal length.

In addition to one or more of the features described herein, the first and second flanges, and the first surface, define a first channel that tapers toward the second end portion.

In addition to one or more of the features described herein, the first and second flanges, and the second surface, define a second channel that tapers toward the second end portion.

In addition to one or more of the features described herein, the first and second channels are substantially of the same shape and size.

In addition to one or more of the features described herein, the outer first face and the outer second face are substantially parallel to one-another.

In addition to one or more of the features described herein, the outer first face and the outer second face are substantially parallel to one-another.

In addition to one or more of the features described herein, the second flange includes a thickness measured between the outer and inner second faces that increases as the elongated rail extends from the first end portion to the second end portion.

In addition to one or more of the features described herein, the first flange includes a thickness measured between the outer and inner first faces that increases as the elongated rail extends from the first end portion to the second end portion.

In addition to one or more of the features described herein, the first end portion defines a first bore centered to a first axis, the second end portion defines a second bore centered to a second axis, and the first bore is larger than the second bore.

In addition to one or more of the features described herein, the first and second axes are parallel to one-another, and the elongated rail is oriented normal to the first and second axes.

In addition to one or more of the features described herein, the web includes a consistent thickness measured from, and between, the first and second surfaces.

In another exemplary embodiment, a combustion engine connecting rod includes a first and second end portions and an elongated rail. The first end portion defines a first bore centered to a first axis. The second end portion defines a second bore centered to a second axis, and the first bore is larger than the second bore. The elongated rail extends along a centerline and spans between, and is connected to, the first and second end portions. The centerline is disposed normal to, and intersects, the first and second axes. The elongated rail includes a web, and first and second flanges. The web is centered along the centerline, and spans laterally between, and is connected to, the first and second flanges of the elongated rail. The first and second flanges are diametrically opposed, and spaced radially outward from, the centerline, and each include an inner face and an outer face. A thickness, measured from and between the inner and outer faces, increases as the elongated rail extends toward the second end portion.

In addition to one or more of the features described herein, the elongated rail includes a longitudinal length measured from the first end portion to the second end portion, and the opposing inner faces of the respective first and second flanges converge as the elongated rail extends toward the second end portion.

In addition to one or more of the features described herein, the elongated rail includes a longitudinal length measured from, and between, the first and second end portions, and the convergence spans over thirty percent of the longitudinal length ending at the second end portion.

In addition to one or more of the features described herein, the first end portion is adapted to connect to a crankshaft, and the second end portion is adapted to connect to a piston pin.

In addition to one or more of the features described herein, the elongated rail has an I-shaped cross section.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figures 1, 2:
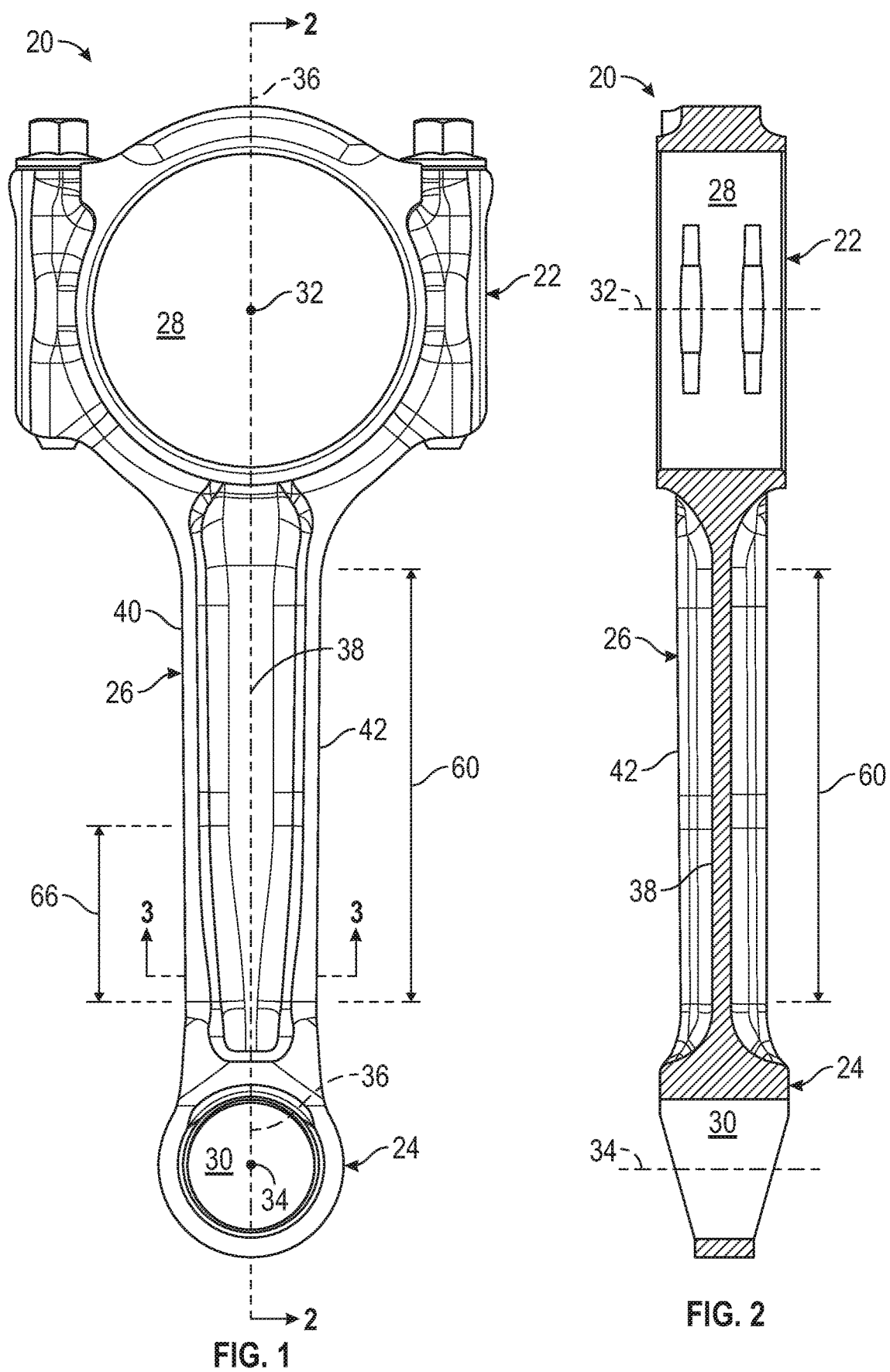
FIG. 1 is a front view of a connecting rod for a combustion engine.
FIG. 2 is a cross section of the connecting rod viewing in the direction of arrows 2-2 in FIG. 1.

The following description is merely exemplary in nature and is not intended to limit the present disclosure, its application or uses. It should be understood that throughout the drawings, corresponding reference numerals indicate like or corresponding parts and features.

In accordance with an exemplary embodiment FIG. 1 illustrates a connecting rod 20. In one embodiment, the connecting rod 20 is for a combustion engine and may be adapted to extend between and connect a crankshaft (not shown) to a piston pin (not shown) as is known by one skilled in the art of combustion engines. The connecting rod 20 includes an end portion 22 (e.g., crankshaft end portion), an opposite end portion 24 (e.g., piston pin end portion), and an elongated rail 26 that extends between, and is connected to, the end portions 22, 24. In one embodiment, the end portion 24, the elongated rail 26, and at least a part of the end portion 22 is formed as one unitary and homogeneous piece made of metal. Examples of the formation process of this unitary piece may include casting, powder metal forming, and forging.

Referring to FIGS. 1 and 2, the end portions 22, 24 include respective bores 28, 30 each having boundaries defined by the respective end portions 22, 24. The bores 28, 30 are centered about respective axes 32, 34. In one embodiment, the axes 32, 34 are parallel to one-another. The elongated rail 26 longitudinally extends along a centerline 36. In one embodiment, the centerline 36 intersects, and is normal to, the axes 32, 34.

Figure 3:
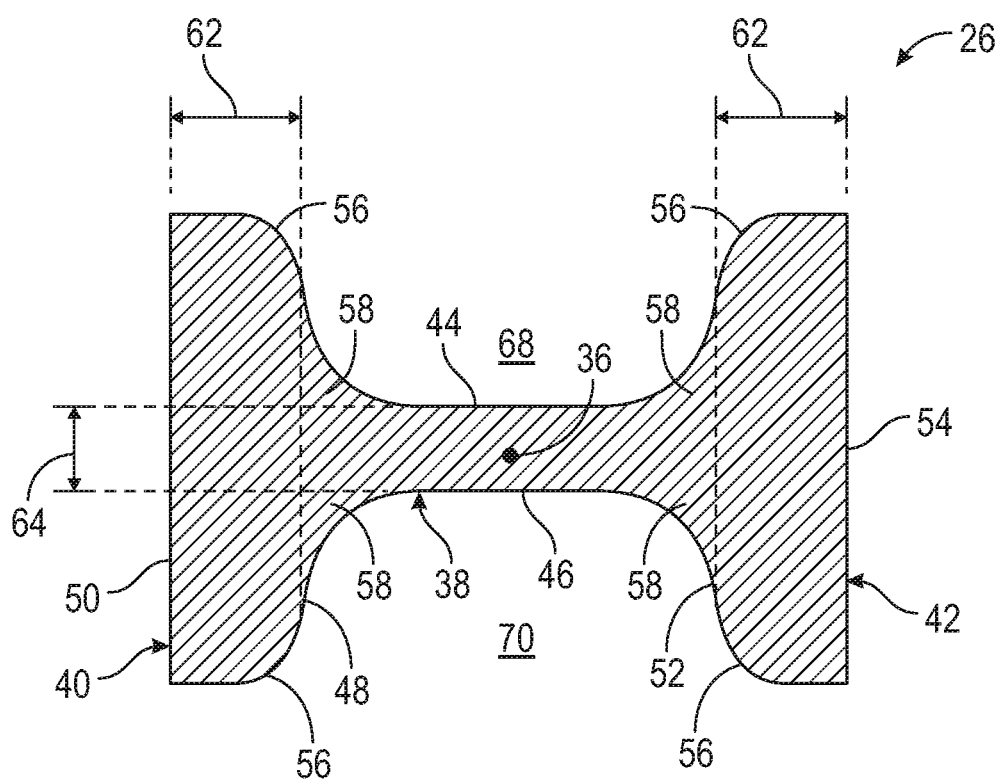
FIG. 3 is a cross section of an elongated rail of the connecting rod viewing in the direction of arrows 3-3 in FIG. 1.

Referring to FIGS. 2 and 3, and in one embodiment, the elongated rail 26 has an I-shaped cross section (see FIG. 3), and includes a web 38, and two flanges 40, 42. The web includes surfaces 44, 46 that are generally opposite to one-another. Flange 40 includes an inner face 48 and an outer face 50, and flange 42 includes an inner face 52 and an outer face 54. The web 38 spans laterally between, and is connected to, the inner faces 48, 52 of the respective flanges 40, 42. In one embodiment, the web 38 is centered to, and longitudinally extends along, the centerline 36. The flanges 40, 42 are diametrically opposed to one-another, and spaced radially from the centerline 36.

Referring to FIG. 3, and for ease of casting the connecting rod 20, the connecting rod 20 may include crown radii 56 (i.e., four illustrated) at outer corners of the flanges 40, 42, and fillets 58 (i.e., four illustrated) where the web 38 connects to the flanges 40, 42. For simplicity of explanation, portions of the inner faces 48, 52 of the respective flanges 40, 42 and portions of the surfaces 44, 46 may be considered to be "beneath" the fillets 58. In one embodiment, the crown radii 56 may be consistently of the same shape, and the fillets 58 may be consistently of the same size along an entire longitudinal length (see arrow 60 in FIGS. 1 and 2) of the elongated rail 26. In another embodiment, the fillets 58 may increase in size (i.e., increasing radius) as the elongated rail 26 extends toward the end portion 24.

As best shown in FIGS. 1 and 3, and in one embodiment, the outer faces 50, 54 of the respective flanges 40, 42 may be substantially planar and parallel to one-another along an the entire longitudinal length 60. In contrast, the inner faces 48, 52 may converge toward one another as the elongated rail 26 extends longitudinally toward the end portion 24. This convergence, has the effect of increasing a thickness (see arrow 62 in FIG. 3) of each flange 40, 42 as the elongated rail 26 extends toward the end portion 24. This increasing thickness adds strength to the elongated rail 26 near the end portion 24 for the re-distribution of what otherwise would be localized, concentrated, stress. Also in this embodiment, the web 38 may include a thickness (see arrow 64) measured from and between the web surfaces 44, 46 that may be of the same thickness along the entire longitudinal length 60.

In one embodiment, the convergence (i.e., becoming radially closer to centerline 36) of the flange inner faces 48, 52 may occur along a distance (see arrow 66 in FIG. 1) that is measured proximate to the end portion 24 and axially toward the end portion 22. In one example, distance 66 may be within a range of about thirty to fifty percent (30% to 50%) of the entire longitudinal length 60.

As best shown in FIGS. 2 and 3, the elongated rail 26 may define boundaries of two channels 68, 70. In one embodiment, the channels 68, 70 are tapered as the elongated rail 26 extends toward the end portion 24. The channel 68 is defined, at least in-part, by the web surface 44 and a portion of the inner faces 48, 52 of the respective flanges 40, 42. The channel 70 is defined, at least in-part, by the web surface 46 and a portion of the inner faces 48, 52 of the respective flanges 40, 42. It is understood that the fillets 58 also contribute toward defining the channels 68, 70.

In one embodiment, the connecting rod 20 is a forged powder metal connecting rod, and the analysis process of designing the connecting rod 20 includes a series of calculations that minimize a column, or rail, response to overload conditions.

Advantages and benefits of the present disclosure include a connecting rod design that increases robustness of the connecting rod while minimizing the mass.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A connecting rod adapted to extend between and connect to a crankshaft and a piston pin, the connecting rod comprising:
    a first end portion adapted to connect to the crankshaft;
    a second end portion adapted to connect to the piston pin; and
    an elongated rail longitudinally extending between the first and second end portions, the rail including a first flange having opposite outer and inner first faces, a second flange having opposite outer and inner second faces, and a web having opposite first and second surfaces, wherein the web laterally spans between and is attached to the inner first face and the inner second face, and the inner first face and the inner second face at least in-part converge toward one-another as the rail extends from the first end portion to the second end portion such that the first flange and the second flange include a first thickness at the first end portion and a second thickness at the second end portion, the second thickness being greater than the first thickness.

2. The connecting rod set forth in claim 1, wherein the elongated rail includes a longitudinal length measured from the first end portion to the second end portion and the convergence of the inner first face and the inner second face initiates proximate to the second end portion and spans within a range of twenty to fifty percent of the longitudinal length.

3. The connecting rod set forth in claim 1, wherein the first and second flanges and the first surface define a first channel that tapers toward the second end portion.

4. The connecting rod set forth in claim 3, wherein the first and second flanges and the second surface define a second channel that tapers toward the second end portion.

5. The connecting rod set forth in claim 4, wherein the first and second channels are substantially of the same shape and size.

6. The connecting rod set forth in claim 5, wherein the outer first face and the outer second face are substantially parallel to one-another.

7. The connecting rod set forth in claim 1, wherein the outer first face and the outer second face are substantially parallel to one-another.

8. The connecting rod set forth in claim 1, wherein the second flange includes a thickness measured between the outer and inner second faces that increases as the elongated rail extends from the first end portion to the second end portion.

9. The connecting rod set forth in claim 8, wherein the first flange includes a thickness measured between the outer and inner first faces that increases as the elongated rail extends from the first end portion to the second end portion.

10. The connecting rod set forth in claim 1, wherein the first end portion defines a first bore centered to a first axis, the second end portion defines a second bore centered to a second axis, and the first bore is larger than the second bore.

11. The connecting rod set forth in claim 10, wherein the first and second axes are parallel to one-another, and the elongated rail is oriented normal to the first and second axes.

12. The connecting rod set forth in claim 1, wherein the web includes a consistent thickness measured from and between the first and second surfaces.

13. A combustion engine connecting rod comprising:
a first end portion defining a first bore centered to a first axis;
a second end portion defining a second bore centered to a second axis, wherein the first bore is larger than the second bore; and
an elongated rail extending along a centerline and spanning between and connected to the first and second end portions, the centerline disposed normal to and intersecting the first and second axes, the elongated rail including a web centered along the centerline and spanning laterally between and connected to first and second flanges of the elongated rail, wherein the first and second flanges are diametrically opposed and spaced radially outward from the centerline and each include an inner face and an outer face, and a thickness measured from and between the inner and outer faces increases as the elongated rail extends toward the second end portion such that the first flange and the second flange include a first thickness at the first end portion and a second thickness at the second end portion, the second thickness being greater than the first thickness.

14. The combustion engine connecting rod set forth in claim 13, wherein the elongated rail includes a longitudinal length measured from the first end portion to the second end portion, and the opposing inner faces of the respective first and second flanges converge as the elongated rail extends toward the second end portion.

15. The combustion engine connecting rod set forth in claim 14, wherein the elongated rail includes a longitudinal length measured from and between the first and second end portions and the convergence spans over thirty percent of the longitudinal length ending at the second end portion.

16. The combustion engine connecting rod set forth in claim 15, wherein the first end portion is adapted to connect to a crankshaft and the second end portion is adapted to connect to a piston pin.

17. The combustion engine connecting rod set forth in claim 13, wherein the elongated rail has an I-shaped cross section.

* * * * *